(12) United States Patent
Murphy-Chutorian et al.

(10) Patent No.: US 8,983,941 B1
(45) Date of Patent: Mar. 17, 2015

(54) VISUAL CONTENT RETRIEVAL

(75) Inventors: Erik Murphy-Chutorian, Palo Alto, CA (US); Charles J. Rosenberg, Cupertino, CA (US); Nemanja Petrovic, Plainsboro, NJ (US); Sergey Ioffe, Mountain View, CA (US); Sean O'Malley, Mountain View, CA (US)

(73) Assignee: Google Inc., Mountain View, CA (US)

( * ) Notice: Subject to any disclaimer, the term of this patent is extended or adjusted under 35 U.S.C. 154(b) by 46 days.

(21) Appl. No.: 13/621,039

(22) Filed: Sep. 15, 2012

Related U.S. Application Data

(63) Continuation of application No. 13/433,137, filed on Mar. 28, 2012.

(60) Provisional application No. 61/468,532, filed on Mar. 28, 2011, provisional application No. 61/605,132, filed on Feb. 29, 2012.

(51) Int. Cl.
*G06F 17/30* (2006.01)

(52) U.S. Cl.
USPC .......................................................... 707/723

(58) Field of Classification Search
CPC .................... G06F 17/30247; G06F 17/30277; G06F 17/30244; G06F 17/30256; G06F 17/30991; G06F 17/30572; G06F 17/30696; G06K 9/6255; G06K 9/627
USPC .......................................................... 707/723
See application file for complete search history.

(56) References Cited

U.S. PATENT DOCUMENTS

| | | |
|---|---|---|
| 2005/0055344 A1 | 3/2005 | Liu et al. |
| 2006/0271559 A1 | 11/2006 | Stavrakos et al. |
| 2007/0081744 A1 | 4/2007 | Gokturk et al. |
| 2008/0082426 A1* | 4/2008 | Gokturk et al. ................. 705/27 |
| 2008/0263042 A1 | 10/2008 | Li et al. |
| 2010/0088295 A1 | 4/2010 | Duan et al. |

OTHER PUBLICATIONS

Liu et al. Article title: "Clustering Billions of Images with Large Scale Nearest Neighbor Search". WACV '07—IEEE Workshop Applications of Computer Vision, 2007. Austin, TX, Feb. 2007. ISBN : 0-7695-2794-9. Digital Object Identifier : 10.1109/WACV.2007.18.*

* cited by examiner

*Primary Examiner* — Pierre Vital
*Assistant Examiner* — Evan Aspinwall
(74) *Attorney, Agent, or Firm* — Fish & Richardson P.C.

(57) ABSTRACT

Methods, systems, and apparatus, including computer programs encoded on computer storage media, for generating image search results. One of the methods includes receiving first image search results responsive to a text query, each first image search result associated with a respective first score indicating a relevance of an image represented by the first image search result to the text query. Second image search results responsive to a query image are received, each second image search result associated with a respective second score indicating a measure of similarity between an image represented by the second image search result and the query image. A set of final image search results is selected including combining first scores and second scores of the selected first image search results. The final image search results are ordered by similarity to the query image.

15 Claims, 10 Drawing Sheets

VISUAL CONTENT RETRIEVAL

CROSS-REFERENCE TO RELATED APPLICATIONS

This application is a continuation of, and claims priority to, pending U.S. patent application Ser. No. 13/433,137, filed on Mar. 28, 2012, entitled, "VISUAL CONTENT RETRIEVAL," which claims the benefit under 35 U.S.C. §119(e) of U.S. Provisional Application Ser. No. 61/468,532, filed on Mar. 28, 2011 entitled "VISUAL CONTENT RETRIEVAL," and U.S. Provisional Application Ser. No. 61/605,132, filed on Feb. 29, 2012 entitled "COMPRESSION OF HIGH-DIMENSIONAL DATA," the entirety of which is herein incorporated by reference.

BACKGROUND

This specification relates to information retrieval.

Conventional information retrieval systems are used to identify a wide variety of resources, for example, images, audio files, web pages, or documents, e.g., news articles. Additionally, search results presented to a user that identify particular resources responsive to a query are typically ranked according to particular criteria.

Conventional image analysis systems can be used to extract features from an image into a feature representation. A representation of an image is a feature vector, where each element of the feature vector is a representation of a feature extracted from the image. All possible feature vectors for an image can define a feature space for the image.

SUMMARY

This specification describes technologies relating to image content retrieval.

In general, one innovative aspect of the subject matter described in this specification can be embodied in methods that include the actions of receiving first image search results responsive to a text query, each first image search result associated with a respective first score indicating a relevance of an image represented by the first image search result to the text query; receiving second image search results responsive to a query image, each second image search result associated with a respective second score indicating a measure of similarity between an image represented by the second image search result and the query image, wherein the measure of similarity is calculated based in part on a distance between a content descriptor associated with the query image and a content descriptor associated with the image; selecting one or more of the first image search results that also occur in the second image search results and whose respective first scores satisfy a first threshold; selecting a set of final image search results including combining first scores and second scores of the selected first image search results; and ordering each of the final image search results by a score derived from a distance between the content descriptor associated with the query image and the content descriptor associated with the respective image represented by the final image search result. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. A content descriptor for an associated image is generated based at least in part on a feature representation of features extracted from the image. Generating the content descriptor comprises hashing a feature vector of the image with one or more hash functions to generate one or more hash values of the representation of features. The feature vector of the image is compressed into a feature representation using principal component analysis. The feature representation is compressed using delta encoding. The actions further include increasing the first score of one or more highest-ranked images in the first image search results. The actions further include removing duplicate and near-duplicate images, wherein near-duplicate images are identified by comparing content descriptors associated with respective images. The actions further include reordering each of the final image search results by a distance between a content descriptor associated with an image represented by a highest-ranked result in the set of final image search results and an associated content descriptor for the image represented by the set of final image search results. The actions further include reducing the first score of one or more of the first image search results whose first score is beyond a dynamic threshold.

In general, another innovative aspect of the subject matter described in this specification can be embodied in methods that include the actions of deriving a set of visual keys by sorting training images into a plurality of image sets wherein each visual key represents one of the image sets and wherein the training images are sorted according to a respective feature representation of each training image; associating one or more of the visual keys with each image in a second set of images, wherein each visual key associated with each image corresponds to one of the image sets to which the image belongs; identifying one or more subsets of images in a collection of images, each subset associated with respective visual keys that match the one or more visual keys associated with the query image; and combining the identified subsets of images into a final set of images. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions further include associating one or more visual keys with each image in the collection of images wherein each visual key associated with each image in the collection of images corresponds to one of the image sets to which the image belongs. The actions further include ordering the final set of images by a distance computed between each image in the final set and the query image, wherein the distance is based on respective content descriptors for each image in the final set and a content descriptor for the query image. Combining the identified subsets of images into a final set of images comprises generating a union or an intersection of the identified subsets to form the final set of images. The actions further include generating the visual keys by traversing a spill tree with a feature representation for each image. The actions further include training the spill tree with a plurality of training images, wherein training comprises generating a pair of decisional feature representations at each non-leaf node of the spill tree. The actions further include generating the decisional feature representations by averaging feature representations of training images at each non-leaf node of the spill tree. The actions further include ranking the visual keys by accumulated spill in the spill tree, wherein the accumulated spill is based on the difference between a distance between a feature representation of each image and each decisional feature representation in the spill tree.

In general, another innovative aspect of the subject matter described in this specification can be embodied in methods that include the actions of deriving a set of visual keys by sorting training images into a plurality of image sets wherein each visual key represents one of the image sets and wherein the training images are sorted according to a respective feature representation of each training image; associating one or more of the visual keys with each image in a second set of images, wherein each visual key associated with each image corresponds to one of the image sets to which the image belongs; comparing a plurality of visual keys generated for a first image of the second set to a plurality of visual keys generated for a second image of the second set; and producing one or more sets of near-duplicate images, wherein if none of a number of visual keys match between the first image and the second image, the first image and second image are not included in a same set of near-duplicate images. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions further include generating visual keys for images in the second set of images by traversing a spill tree with a feature representation for each image in the second set of images. The actions further include training the spill tree with a plurality of training images, whereby wherein training comprises generating a pair of decisional feature representations at each non-leaf node of the spill tree. The actions further include generating the decisional feature representations including averaging feature representations of training images at each non-leaf node of the spill tree. The actions further include ranking the visual keys by accumulated spill in the spill tree, wherein the accumulated spill is based on the difference between a distance between a feature representation of each image and each decisional feature representation in the spill tree. Comparing a plurality of visual keys generated for a first image of the second set to a plurality of visual keys generated for a second image of the second set comprises comparing a number of highest-ranked visual keys for each image. If one or more visual keys of the first image and the second image match, the actions further include determining that the first image and the second image are near-duplicates including computing a distance between feature representations associated with each respective image; and comparing the computed distance to a threshold. If the computed distance meets the threshold, the actions further include adding each image search result to a category of near-duplicate images. The actions further include comparing respective feature representations associated with each of N highest-ranked images in the second set of images to one another; identifying near-duplicate images based on the comparison of respective feature representations; and adding near-duplicate images to categories of near-duplicate images. The actions further include comparing respective feature representations associated with each image ranked between N+1 and an upper bound M to respective feature representations associated with each of the N highest-ranked images in the second set of images, and adding near-duplicate images to categories of near-duplicate images. The actions further include training the spill tree with a plurality of training images, wherein training comprises generating a pair of decisional feature representations at each non-leaf node of the spill tree. The actions further include generating the decisional feature representations by averaging feature representations of training images at each non-leaf node of the spill tree.

In general, another innovative aspect of the subject matter described in this specification can be embodied in methods that include the actions of receiving feature vectors u and v; generating a hash vector x, including applying multiple hash functions to u to compute multiple hash values, wherein elements of hash vector x are the hash values of u; generating a hash vector y, including applying multiple hash functions to v to compute multiple hash values, wherein elements of hash vector y are the hash values of v; computing an approximation A of the probability of a hash collision between u and v as the number of hash values that match between corresponding elements of the hash vector x and the hash vector y, divided by the length of the hash vector x or the hash vector y; and computing an approximation of an intersection kernel between u and v, wherein the approximation of the intersection kernel satisfies the equation $$IntK(u, v) = \frac{A \times (|u|_1 + |v|_1)}{1 + A},$$

wherein $|u|_1$ is the L1 norm of u, and $|v|_1$ is the L1 norm of v. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. A representation r of the feature vector u is generated from a kernel PCA process, including using the hash vector x to compute a kernel vector comprising approximations of an intersection kernel between u and each vector in a plurality of reference vectors, wherein the feature vector v occurs in the plurality of reference vectors. The feature vector u corresponds to content of a data object. The content of the data object comprises image content. A measure of similarity is determined between content of the data object corresponding to u and content of a second data object corresponding to a second representation s including computing a distance between the representation r and the representation s.

In general, another innovative aspect of the subject matter described in this specification can be embodied in methods that include the actions of receiving a plurality of vectors; computing an approximation of an intersection kernel between each vector u in the plurality of vectors and each vector v in a set of reference vectors, including generating a hash vector x, including applying multiple hash functions to u to compute multiple hash values, wherein elements of hash vector x are the hash values of u, generating a hash vector y, including applying multiple hash functions to v to compute multiple hash values, wherein elements of hash vector y are the hash values of v, computing an approximation, A, of the probability of a hash collision between u and v as the number of hash values that match between corresponding elements of the hash vector x and the hash vector y, divided by the length of the hash vector x or the hash vector y, and computing an approximation of the intersection kernel between u and v, wherein the approximation of the intersection kernel satisfies the equation:

$$IntK(u, v) = \frac{A \times (|u|_1 + |v|_1)}{1 + A},$$

wherein $|u|_1$ is the L1 norm of u and $|v|_1$ is the L1 norm of v. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions further include generating a square matrix T using corresponding approximated intersection kernel values between vectors u and vectors v; and generating a projection matrix P for kernel PCA analysis using matrix T. Each vector corresponds to the content of an image. A respective representation r is generated for each vector u in the plurality of vectors using a kernel PCA process, including using a hash vector x comprising hash values of u to compute a kernel vector comprising approximations of an intersection kernel between u and each vector v in the set of reference vectors. The actions further include receiving a query image; computing a feature vector for the query image; generating a representation s for the query image using the kernel PCA process; computing a measure of similarity between the query image and each image corresponding to each vector u, including computing a distance between s and each respective representation r; and ranking images corresponding to the representations r using respective measures of similarity.

In general, another innovative aspect of the subject matter described in this specification can be embodied in methods that include the actions of receiving a feature vector u, wherein the feature vector u corresponds to the content of a data object; generating a hash vector x, including applying multiple hash functions to u to compute multiple hash values, wherein elements of hash vector x are the hash values of u; generating a representation r of the feature vector u by a kernel PCA process, including using the hash vector x to compute a kernel vector, wherein the kernel vector comprises approximations of an intersection kernel between u and each vector in a plurality of reference vectors. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions further include computing an approximation, A, of the probability of a hash collision between u and each vector v in the plurality of reference vectors as the number of hash values that match between corresponding elements of the hash vector x and a hash vector y comprising hash values of v, divided by the length of the hash vector x or the hash vector y, wherein an approximation of the intersection kernel between u and v satisfies the equation:

$$IntK(u, v) = \frac{A \times (|u|_1 + |v|_1)}{1 + A},$$

wherein $|u|_1$ is the L1 norm of u and $|v|_1$ is the L1 norm of v. A measure of similarity is determined between content of a first data object corresponding to representation r and content of a second data object corresponding to a representation s, including computing a distance between representation r and representation s. The first data object and the second data object are images.

In general, another innovative aspect of the subject matter described in this specification can be embodied in methods that include the actions of receiving a vector corresponding to the content of an image; dividing the vector into blocks; identifying a vector maximum, the vector maximum being a maximum of the absolute values of all elements of the vector; dividing a range between 0 and the a global maximum into a plurality of first intervals; encoding the vector maximum as a value that identifies a particular first interval of the plurality of first intervals; identifying for each block a respective block maximum, wherein each block maximum is a maximum of the absolute values of all elements in each block; dividing a range between 0 and the vector maximum into a plurality of second intervals; encoding each block maximum $B_{max}$ as a value that identifies a particular second interval of the plurality of second intervals; dividing in each block a range between $-B_{max}$ and $B_{max}$ into a plurality of third intervals; encoding each vector element in a block as a value that identifies a particular third interval of the plurality of third intervals; and generating an image content descriptor comprising the encoded vector maximum, each encoded block maximum, and each encoded vector element. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions further include multiplying the vector by a rotation matrix to normalize variances between elements of the vector. The vector corresponding to the content of an image is generated by a kernel PCA process. The actions further include decoding the image content descriptor into a decoded feature vector; and computing a measure of similarity between the image and another image, including computing a distance between the decoded feature vector and another feature vector corresponding to the other image. Decoding the image content descriptor into a feature vector includes identifying a first value in an interval corresponding to the encoded vector maximum; identifying a second value in an interval corresponding to each encoded block maximum; identifying a third value in an interval corresponding to each encoded vector element; computing a decoded vector maximum including multiplying the first value by the global maximum; computing respective decoded block maxima including multiplying each second value by the decoded vector maximum; computing respective decoded vector elements including multiplying each third value by each respective decoded block maximum; and generating the decoded feature vector using the decoded vector elements. The global maximum is a maximum value of all absolute values of all vector elements in a collection of vectors.

Particular embodiments of the subject matter described in this specification can be implemented so as to realize one or more of the following advantages. Generating visual keys for images allows similar image content to be identified in constant time and instead of performing a comparison on every image in a collection. Combining visual keys with text queries allows users to perform a more-focused search where a text query alone might have multiple meanings or is ambiguous (e.g., "jaguar"). Generating visual keys can improve identification of near-duplicate images by speeding up the rejection of images that are not near-duplicates. Generating visual keys for images also allows integration with existing systems for text-based retrieval, eliminating the need for additional servers. Using visual keys for image retrieval can outperform offline similar image systems. A system using visual keys can search for unseen content in an existing index, whereas an offline system can only provide results for images known in advance.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Text queries alone may be inadequate in a variety of circumstances. A text query may have multiple meanings when a user is interested in only one specific meaning of a text query. Thus, image content retrieval by a search system can be improved when the system is configured to accept queries that include both a text portion and an image content portion.

Figure 1:
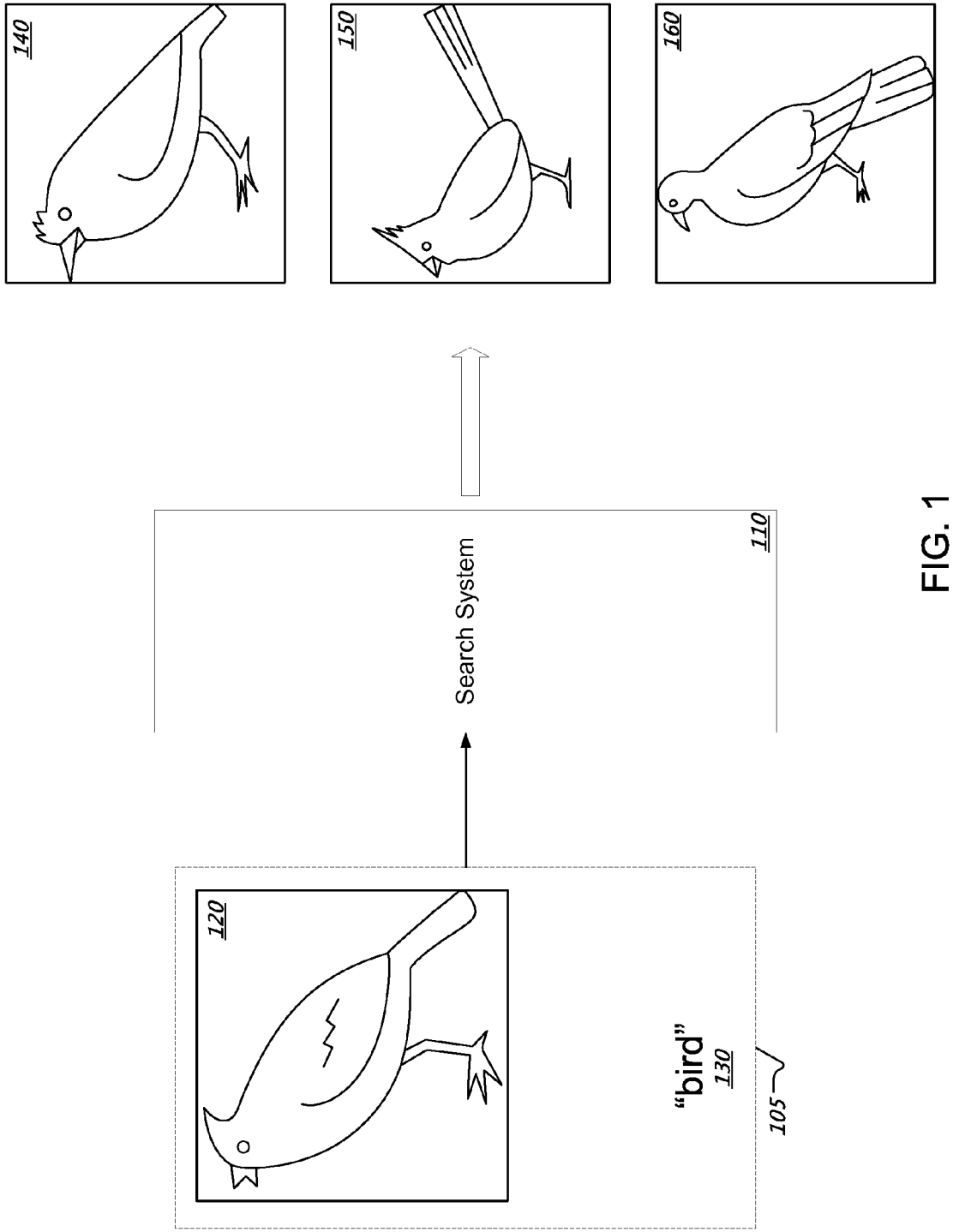
FIG. 1 illustrates the inputs and outputs of an example search system that accepts queries having a text portion and an image content portion.

FIG. 1 illustrates the inputs and outputs of an example search system 110 that accepts queries having a text portion and an image content portion. A query 105 with text and images portions includes query text 130 and a query image 120. A query with a text portion and an image portion can be used by the search system to identify images that are relevant to the query text 130 and which are also visually similar to the query image 120. For example, image search results 140, 150, and 160 are all images of birds, and they are also visually similar to the query image 120. The search system can optionally order the image search results 140, 150, and 160 for presentation to a user by a measure of similarity to the query image 120, or the search system can use the measure of similarity as an element in computing a ranking score for ranking the search results for presentation. Generally, higher ranking or more similar images are presented first, so as illustrated in FIG. 1, image search result 140 is most similar to the query image 120, followed by image search results 150 and 160. The search system 110 can optionally omit images that are identical to query image 120, or which are near-duplicates of query image 120.

Figure 2:
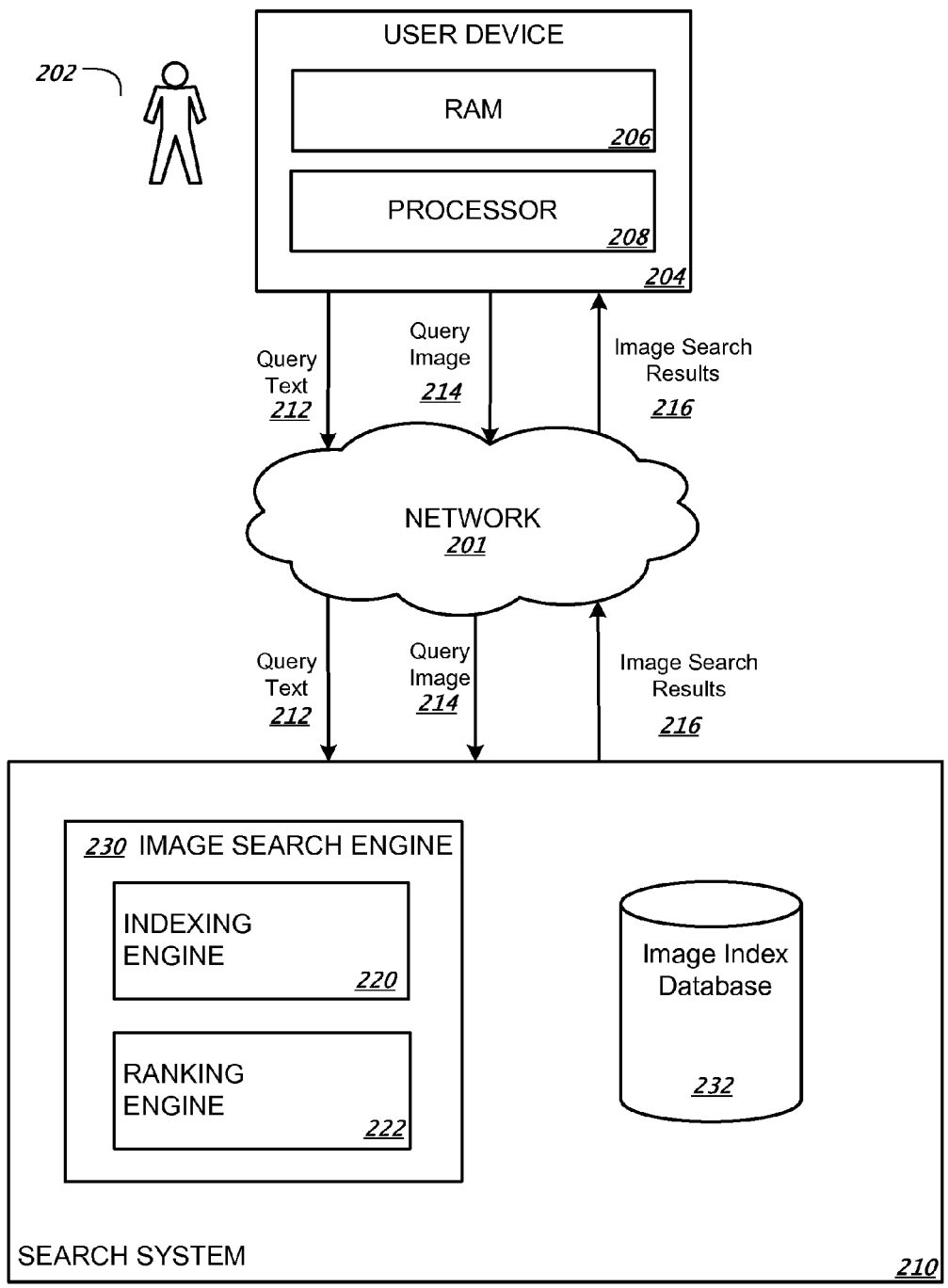
FIG. 2 is a diagram of an example search system.

FIG. 2 is a diagram of an example search system 210. The search system 210 can be implemented on or more computers operating in one or more locations in an Internet, an intranet, or another client and server environment. The search system 210 can provide image search results 216 that satisfy query text 212 and also provide image search results identifying images that are determined by the system to be visually similar to a query image 214. The search system 210 is an example of an information retrieval system in which the systems, components, and techniques described below can be implemented.

The search system 210 can be implemented as, for example, one or more computer programs running on one or more computers in one or more geographic locations. The computers can exchange information through one or more networks. The search system 210 includes an image search engine 230. The search system 210 responds to the query text 212 and query image 214 by generating image search results 216, which are transmitted through the network to the user device 204 in a form that can be presented to the user 202, e.g., as an interactive web page to be displayed in a web browser running on user device 204.

A user 202 can interact with the search system 210 through a user device 204. For example, the user device 204 can be a data processing apparatus such as a personal computer, a laptop computer, a tablet computer, a smart phone, or a personal digital assistant. The user device 204 will generally include a random access memory (RAM) 206 and a processor 208. The user device 204 can communicate with other devices through one or more local area networks (LANs) or wide area networks (WANs) 201.

A user 202 can submit queries to an image search engine 230. A query can include query text 212, a query image 214 or multiple query images, or both.

The query image 214 can be an image uploaded to search system 210 by a user of the user device 204, and the query image 214 can have been captured using a digital camera integrated into the user device 204, for example. The query image 214 can also be selected by a user 202 of the user device 204 from a list of image search results provided in response to a query.

Image search results can be identified from a collection of images using one or more index databases. An indexing engine 220 can index images in a collection of images, e.g., images available on the Internet, in an image index database 232. The indexing engine can index images in image index database 232 according to text associated with the image including, for example, text from surrounding context, e.g., in a web page, text that occurs in the image, and text labels determined by image classifiers. The indexing engine 220 can also index images in the image index database 232 according to visual keys derived from an image's content. The system can use visual keys to identify indexed images that share one or more similar features. In some implementations, images can be indexed by text and by visual keys in separate indexes. A ranking engine 222 can rank image search results by a combination of scores that are based on data indicating relevance of an image to the query text 212 and a similarity to the query image 214. In some implementations, the similarity between images is computed using their respective image content descriptors. An image content descriptor can be, for example, a compressed version of a representation of features of an image.

The features of an image can be extracted by computing a numerical representation of each feature, i.e., a feature value. Computing feature values of an image can be referred to as extracting features from the image. The feature values can be used as vector elements of a feature vector, that is, a vector of feature values. The elements of a feature vector can also be referred to as "features." Whether "feature" refers to a property of image content or a numerical value in a feature vector will be apparent from the context in which the term is used. In the usage of the field, an image is said to have a feature vector. Image feature values can include, for example, histogram values of image color or gray scale data, e.g., the number of red pixels in an image; image locations of edges, corners, textures, centers of gravity, or other interest points; and other geometric information. Image features values for the same abstract feature can be extracted multiple times from multiple scales of an input image, with each appearing in a feature vector for the input image. The feature values of a feature vector can be weighted so that a particular feature value or set of feature values does not dominate the feature vector.

Additionally, the features values extracted from an image and associated weights can be determined by a machine learning system that is trained so that the L1 distance between feature vectors gives a reasonable approximation of visual similarity between images. The training data for such a system can be pairs of images having visual similarity ratings provided by human raters.

A search system can compress a feature vector of an image into a significantly smaller representation of the visual content of an image, called an image content descriptor.

Figure 3:
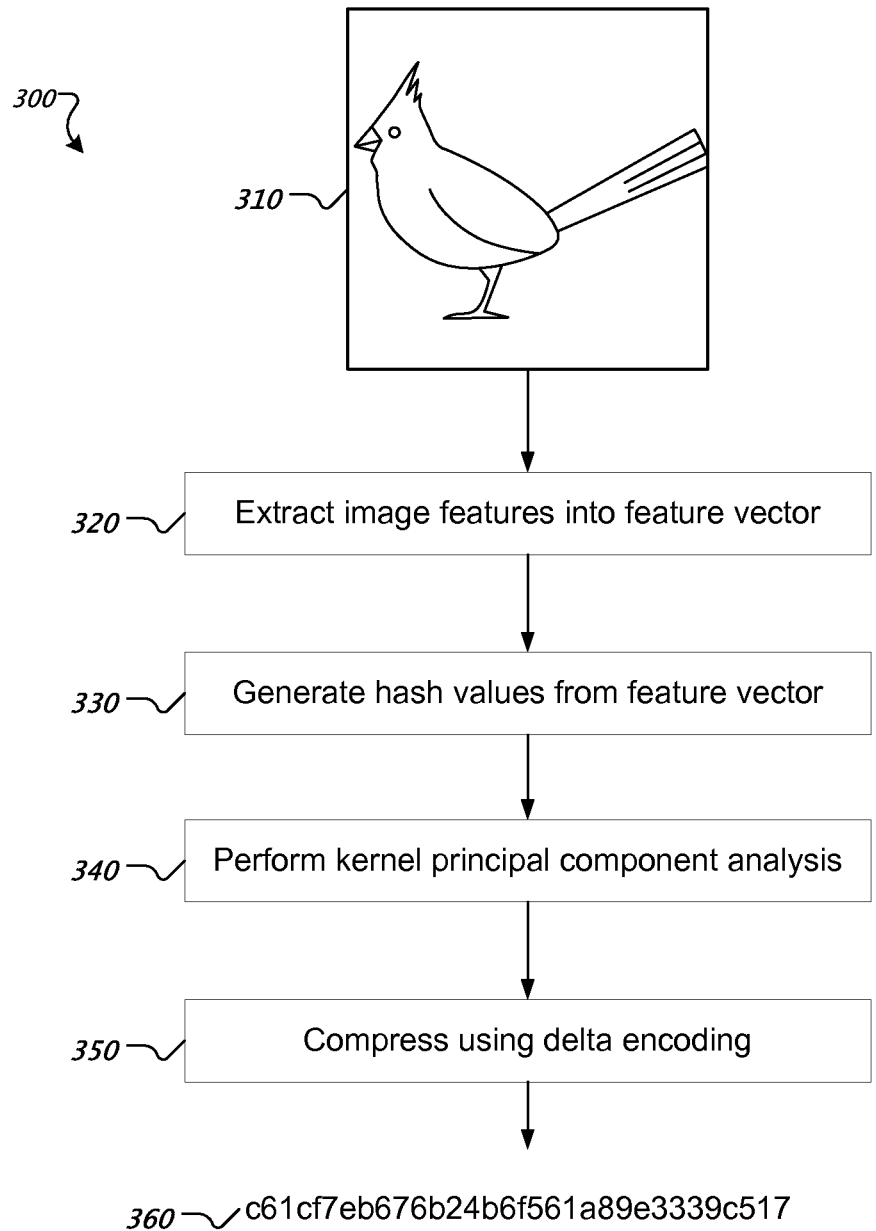
FIG. 3 is a flow chart of an example process for generating an image content descriptor.

FIG. 3 is a flow chart of an example process 300 for generating an image content descriptor. The process 300 will be described as being performed by a computer system of one or more computers. The process 300 can be carried out in parallel on multiple input images 310. In general, the process compresses a feature vector of an input image 310 into an image content descriptor 360.

Because the image content descriptor is smaller than the feature vector, the process 300 reduces the amount of storage space required image feature representations, enabling more feature representations to be loaded into a finite amount of random-access memory.

The system receives an input image 310. The system extracts image features into a feature vector (320). The features will generally include both directly measurable quantities, e.g., the number of pixels where the RGB color is between (245, 0, 0) and (255, 10, 10)—i.e., red pixels, and quantities that are the result of a possibly complex computation, e.g., a linear combination of a weighted set of histogram values.

The feature vector of input image 310 can be large, e.g., 500,000 dimensions, and may therefore occupy a significant amount of storage space. To reduce the storage space required to store the feature vector, the system can use kernel principal component analysis.

Principal component analysis ("PCA") is a conventional technique that transforms input data into a smaller number of components called principal components. The PCA process generates principal components that correspond to as much of the variability or "energy" in the input data as possible. Kernel PCA is a variation of PCA that uses kernel methods, which allows the dot products performed by the PCA process to be replaced by nonlinear operations. In some implementations, the system can use a kernel that preserves the L1 distances between the image feature vectors. The intersection kernel is an example of such a kernel. The intersection kernel IntK(u, v) between two feature vectors u and v of size D is given by:

$$IntK(u, v) = \sum_{i}^{D} \min(u_i, v_i).$$

The kernel PCA process begins with a set of training examples, which can be feature vectors of images in a collection of images. To generate a set of training examples, the system can select N, e.g. 10,000, images from a collection of images and compute feature vectors for the selected images as training examples. The system can then build an N×N matrix T, where each row and each column in the matrix corresponds to a particular training example, and each value in the matrix is the intersection kernel between the corresponding training examples. The system then performs an eigendecomposition on the matrix T to compute an N×M projection matrix P, where M is the desired number of output dimensions.

To perform kernel PCA on a new feature vector x, the system computes a kernel vector K which is an N-element row vector of intersection kernels between the vector x and each of the N training examples. The system then computes a representation of the feature vector x as a projection R, an M-dimensional vector given by multiplying the projection matrix P by the kernel vector K, or:

$$R=KP.$$

However, computing the intersection kernels directly can be computationally expensive, particularly if there are many training examples or if the image feature vectors have many dimensions. For example, with 10,000 training examples and 500,000-dimension feature vectors, the system would need to compute 10,000 intersection kernels, and each computation would require summing 500,000 values. Therefore, the system reduces the computation required for the kernel PCA process by approximating the intersection kernels using hash functions, rather than computing the actual intersection kernels. Other techniques could also be used to calculate approximate values of the intersection kernels. See, e.g., Subhransu Maji et al., *Classification Using Intersection Kernel Support Vector Machines is Efficient*, In Proceedings, CVPR 2008, Anchorage, Ak.

The system generates hash values from the feature vector (330). Hash functions can be used to transform a feature vector of an image into a representation that requires less storage space but which can still be used to determine approximate measures of similarity between feature vectors. A hash function maps input data to a hash value. For example, a single hash function can map a vector of 500,000 dimensions into a three-bit value. Locality-sensitive hashing is a conventional method that uses a particular family of probabilistic hash functions to map input data to hashes. A hash collision occurs when a hash function maps two different vectors to the same hash value. The probability of a hash collision between hashes of the input vectors can be used as a measure of similarity between the vectors. Multiple hashes can be used to approximate the probability of a hash collision empirically. The probability of a hash collision can then be used to compute a similarity measure between the input vectors, for example, the Jaccard similarity.

In some implementations, the system generates the hashes using a consistent weighted sampling process, e.g., weighted minhash. A consistent weighted sampling process can generate, for an input vector S, a hash value that depends on sampled independent random variables and non-zero elements of S, with the property that the probability of a hash collision between the respective hash values of two vectors, S and T, equals the Jaccard similarity of S and T. The system can repeat the sampling process multiple times, e.g., 1,000, 5,000, or 15,000 times, to generate multiple hash values for the image feature vector. The multiple hash values can be stored in a vector of hash values, which can be used to compute an approximation of an intersection kernel between the two original vectors.

The probability of a hash collision between two vectors u and v can be approximated by generating two hash vectors, x and y, where x contains multiple hash values from multiple hash functions applied to vector u, and y contains multiple hash values from the same multiple hash functions applied to vector v. The approximate probability of a hash collision can then be computed. In other words, the number of hash values that match between x and y divided by the total number of hash values, or the length L of x or y. Thus, approximation A of the probability of a hash collision between u and v can be computed by:

$$P(hashcollision(u, v)) \approx \frac{\sum_i^L x_i == y_i}{L} = A, \quad (1)$$

where $x_i == y_i$ has the value one (1) if $x_i$ is equal to $y_i$ and the value zero otherwise.

The probability of a hash collision can be used to compute the intersection kernel between u and v as follows. The probability of a hash collision is equal to the Jaccard similarity between u and v, J(u, v), which is given by:

$$J(u, v) = \frac{\sum_i^D \min(u_i, v_i)}{\sum_i^D \max(u_i, v_i)}.$$

The numerator is the intersection kernel between u and v. The denominator can be computed using the intersection kernel and the L1 norms of u and v, given by:

$$\sum_i^D \max(u_i, v_i) = |u|_1 + |v|_1 - \sum_i^D \min(u_i, v_i).$$

The last term is also the intersection kernel. Therefore, the system can compute an approximation of the intersection kernel using only the approximated probability of a hash collision, A, the L1 norm of u, $|u|_1$, and the L1 norm of v, $|v|_1$, by solving for the intersection kernel, as follows:

$$IntK(u, v) = \frac{A \times (|u|_1 + |v|_1)}{1 + A}.$$

By using an approximate value for P(hashcollision(u, v)), for example, the approximation A given by equation (1), above, the system can efficiently compute an approximation of the intersection kernel between the original vectors u and v by using only the hash vectors x and y and the L1 norms for u and v. The system can therefore also reduce the storage space needed for feature vectors by storing only the hash vectors and L1 norm of each image feature vector for images in a collection of images, rather than, e.g., all 500,000 dimensions of the original feature vectors.

The system performs kernel principal component analysis (340). As mentioned above, the system can generate the kernel vector K using intersection kernels between a feature vector and each training example. The system can then multiply kernel vector K by the projection matrix P to give the reduced-dimension projection R. The size of the reduced-dimension projection R depends on the number of dimensions chosen for the kernel PCA process. In some implementations, the projection R contains around 500 dimensions.

The system compresses the projection R using delta encoding (350). The system can use a two-level delta encoding method to compress the output of the kernel PCA process, as described in more detail below. Because the PCA process can order the output projection R by components with the highest variability, a number of first elements of the M elements of R can be selected for compression. The system can reduce the size of R using encoding. For example, the first 59 elements of R can be encoded with a two-level delta encoding process into a content descriptor of 32 bytes. Other sizes of content descriptors are possible. For example, 119 dimensions can be compressed into 64 bytes, and 479 dimensions can be compressed into 256 bytes.

Some elements of output projection R may have variances that differ dramatically from those of other elements, due to the kernel PCA process. Therefore, compressing R with delta encoding may require allocating more bits to some dimensions than others. Thus, the system can normalize the variances of the elements of R by first multiplying the projection R by a randomly chosen rotation matrix, i.e., an orthonormal matrix. In some implementations, the system generates a rotation matrix by selecting matrix entries from a Gaussian distribution with unit variance and performing Gram-Schmidt orthogonalization on the matrix.

The system can use one or multiple rotation matrices to normalize the projection R. In some implementations, instead of multiplying every projection R by the rotation matrix, the system can multiply a generated rotation matrix by the projection matrix P, effectively storing the rotation matrix values within projection matrix P.

In some implementations, the system can generate a block diagonal rotation matrix, which can allow the R to be truncated to any appropriate length while maintaining a reasonable L2 distance between corresponding output vector representations. The system can generate a different rotation matrix for each block. For example, the system can choose a rotation matrix that corresponds to four 60×60 blocks by selecting 4 rotation matrices to build the larger, block diagonal rotation matrix. Other entries in the matrix can be set to 0. A 240×240 block diagonal rotation matrix can be generated with 60×60 square rotation matrices R1, R2, R3, and R4, and 60×60 square zero matrices, 0, as follows:

$$240 \times 240 \text{ rotation matrix} = \begin{bmatrix} R1 & 0 & 0 & 0 \\ 0 & R2 & 0 & 0 \\ 0 & 0 & R3 & 0 \\ 0 & 0 & 0 & R4 \end{bmatrix}.$$

By multiplying R, or the projection matrix P, by a block diagonal rotation matrix, the projection R can be truncated at a block boundary and still maintain a reasonable L2 distance with other representations.

Figure 4:
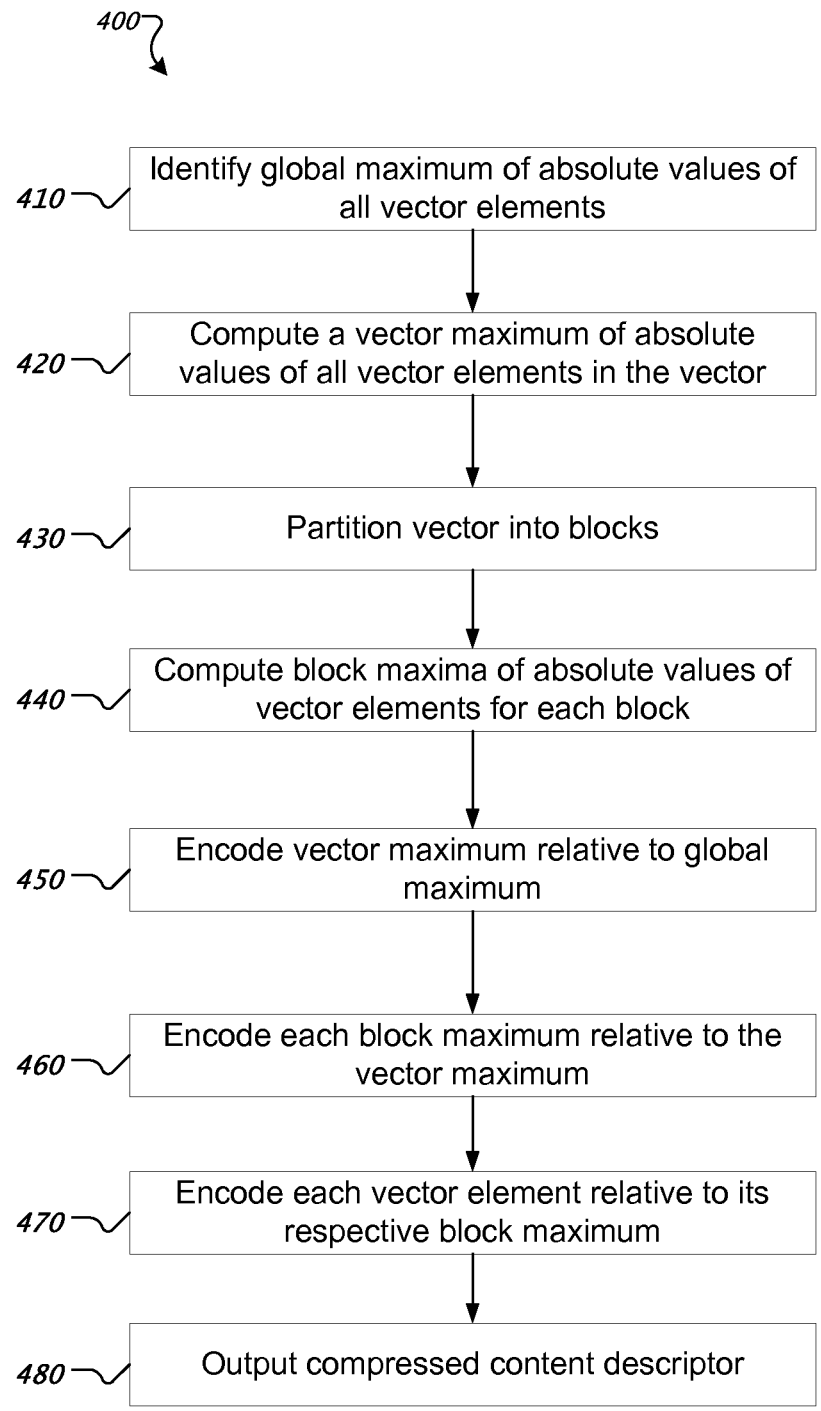
FIG. 4 is a flow chart of an example encoding process.

FIG. 4 is a flow chart of an example encoding process 400. The process 400 can be performed by a computer system of one or more computers. The process 400 can operate on the output of the kernel PCA process as described with reference to FIG. 3, but need not be performed by the same device.

The process 400 can take as input a vector, e.g., a vector of floating point numbers, e.g., a projection of the feature representation of an image, and output an encoded sequence of values that requires less storage space than the input.

The system determines a global maximum (410). The global maximum can be a maximum of the absolute values of all vector elements of all input vectors. The global maximum can be a magnitude of a feature vector element which no individual vector element in any feature vector is expected to exceed. The system can use a single, system-wide value as a global maximum, which can be based on a vector element having the largest absolute value over a collection of vectors, e.g., over all projections R.

The system computes a vector maximum for each input vector (420). The vector maximum is a maximum of the absolute values of all vector elements in the vector.

The system partitions the vector into blocks (430). The partitions need not be of equal size and need not be contiguous. Partitioning the vector into blocks can help to maintain the variability of input elements in each block when encoding the vector. For example, if the vector is the output of a PCA process, the elements in a first block can be of much higher significance than elements in other blocks. Partitioning the vector into blocks can maintain variability of the elements by preventing all elements in a particular block from being encoded to a single value, e.g., zero. As mentioned above, the block partitioning can follow the blocks selected for a block diagonal rotation matrix.

The system computes block maxima of absolute values of vector elements for each block (440).

The system encodes the vector maximum of each input vector relative to the global maximum (450), i.e., with an encoded value that represents the ratio of the vector maximum to the global maximum. The encoding process can include mapping an input value to one of a series of intervals between a minimum value, e.g., zero, and a maximum value, e.g., the global maximum. For example, if four bits are available for encoding the vector maximum relative to the global maximum, the system can compute 16 intervals, because four bits can represent 16 intervals, between zero and the global maximum. The system can then determine in which interval the vector maximum falls. In general, the system can encode the vector maximum $V_{max}$ relative to the global maximum U in N bits for a vector having elements $x_i$ as:

$$E(V_{max}) = \left\lceil \frac{\max(|x_i|)}{U} \times 2^N \right\rceil - 1.$$

For example, if the global maximum is 6.4, the system can compute 16 intervals at 0-0.4, 0.4-0.8, 0.8-1.2, etc. If the vector maximum is 5.91, the system can encode this value as 14, which is the number of the interval containing 5.91. Using 4 bits, the system can represent the vector maximum in binary as 1110, or, in hexadecimal notation, 0xE. Considered as a ratio, the value has an implicit binary point before the first bit.

The system encodes each block maximum relative to the vector maximum (460). The system can compute a number of intervals corresponding to a number of bits allocated to encoding each block maximum. The system can encode the block maximum $B_{max}$ relative to the vector maximum $V_{max}$ in N bits for elements $y_i$ in a block as:

$$E(B_{max}) = \left\lceil \frac{\max(|y_i|)}{V_{max}} \times 2^N \right\rceil - 1.$$

For example, if the vector maximum is 3.2, with four bits the system can compute 16 intervals at 0-0.2, 0.2-0.4, etc. The system can then encode each block maximum relative to the vector maximum, and can represent each block maximum with four bits. For example, if the block maximum is 0.53, the system can encode this value relative to the vector maximum as hexadecimal value 0x2, the number of the interval containing 0.53.

The system encodes each vector element relative to its respective block maximum (470). Because the value of each vector element to be encoded can be signed, i.e. negative or positive, the last encoding relative to the block maximum can represent signed values. Because no vector element will exceed its block maximum, system can encode the vector element relative to the block maximum as a value between −1 and 1. Therefore, with N bits, the system can define 2^N intervals between −1 and 1 for each vector element and encode the vector element as one of these intervals. The system can encode the vector element $v_i$ relative to the block maximum $B_{max}$ in N bits as:

$$E(v_i) = \left\lceil \left( \frac{v_i}{B_{max}} + 1 \right) \times 2^{N-1} \right\rceil - 1.$$

The system outputs the compressed content descriptor (480). The system can pack the encoded bit representations of the vector maximum, the block maxima, and each vector element into a compressed content descriptor. For example, for a 59-element input vector, the system can partition the vector into four blocks of 15, 15, 15, and 14 elements. After encoding each element in 4 bits indicating the value of the element relative to the vector maximum, the four block maxima, and the 59 individual vector elements, the compressed output content descriptor can occupy a total of 32 bytes.

When comparing two compressed content descriptors, the system can first decompress the content descriptors before using the content descriptors to compute a distance metric. An exact reconstruction of the input vector is generally not possible due to quantization from the encoding process. The system can reconstruct the input vector values approximately by choosing a midpoint value of each encoded interval. For example, if an encoded interval corresponds to 3.0-4.0, the system can choose 3.5 as the midpoint value.

Thus, the system can reconstruct the vector maximum $V_{max}$ approximately from its encoded value $E(V_{max})$ and the global maximum U as:

$$V_{max} = E(V_{max}) \times \frac{U}{2^N}.$$

Similarly, the system can reconstruct a block maximum $B_{max}$ approximately from its encoded value $E(B_{max})$ and the reconstructed vector maximum $V_{max}$ as:

$$B_{max} = E(B_{max}) \times \frac{V_{max}}{2^N}.$$

The system can reconstruct each vector element $v_i$ approximately from its encoded value $E(v_i)$ and the reconstructed approximate block maximum $B_{max}$ as:

$$v_i = B_{max} \times \left[\frac{E(v_i)}{2^{N-1}} + \frac{1}{2^N} - 1\right].$$

After decompressing two output content descriptors, the system can compute the distance between each decompressed content descriptor using a distance metric, e.g., the L2 distance.

Figure 5:
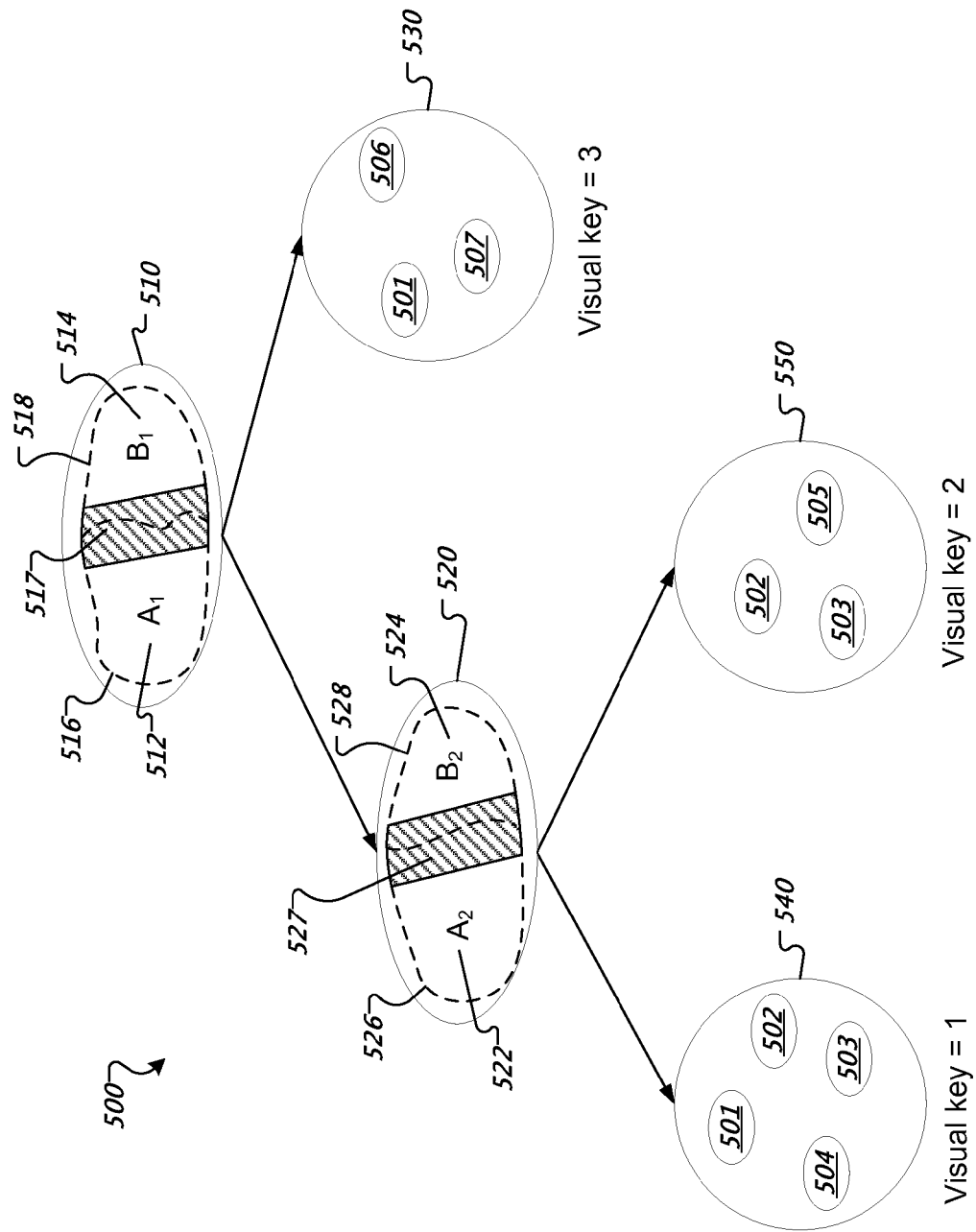
FIG. 5 is a diagram of an example spill tree with a root node.

FIG. 5 is a diagram of an example spill tree 500 with a root node 510. A spill tree is a data structure similar to a binary tree, but in which branches in the tree need not strictly partition the data into two partitions. Instead, data elements can be shared by sibling child nodes at each branch in the spill tree; or equivalently, input data elements can follow one or more children at each branch. Although shown with two child nodes (e.g., node 520 and node 530) per branch in FIG. 5, a spill tree can have any arbitrary number of child nodes at each branch. For example, a spill tree can be implemented as a quad tree with four nodes at each branch.

A spill tree can be used to assign visual keys to images. Visual keys identify a subset of images that are likely to share one or more similar features. A spill tree, e.g. spill tree 500, can be used by a computer system to derive visual keys from feature representations of images. Images whose feature representations traverse the spill tree to the same leaf node can be assigned the same visual key. Images can share multiple visual keys. A spill tree can be used on any feature representation of an image, including a feature representation at any stage of dimensionality reduction and compression, e.g., the stages shown in FIG. 3. For example, the spill tree 500 can be used on the original feature vector, the hash vector computed from the feature vector, the output projection of a kernel PCA process, or the compressed content descriptor.

To generate a spill tree that can be used for assigning visual keys to images, a set of training images can be used to compute the branch conditions at each branch in the spill tree. After training, branch conditions determine how the system will traverse the spill tree with subsequent input feature representations, and therefore, which visual keys the system will assign to the corresponding images. Branch conditions can be defined in numerous ways. For example, a branch condition can include chosen or generated decisional feature representations, each associated with a particular child node at that branch. When traversing the spill tree with a particular image's feature representation, the system computes a distance between the image's feature representation and each decisional feature representation for a particular non-leaf node. In this context, the system can be said to be computing the branch to which the image is closest at that node. The system will then traverse the tree to the child node associated with the closest branch, as determined by the computed distance between the image's feature representation and the decisional feature representations of each branch. In some circumstances, e.g., if the image is between two branches, the system can traverse the spill tree to multiple child nodes.

After training the spill tree by computing branch conditions at each branch, the system can traverse the spill tree with feature representations of images in a collection of images to one or more leaf nodes for each image.

When the system is traversing the spill tree with an image, the feature representation of the image will be compared to each decisional feature representation at a particular non-leaf node to determine which child node, or nodes, the system should follow. The comparison can be based on a particular distance function or a particular similarity function. For example, the distance could be the L1 distance, L2 distance, or Jaccard distance. The system can then traverse the spill tree to the child node whose associated decisional feature representation resulted in the smallest distance, or greatest similarity. The system can additionally follow one or more other child nodes if the difference between the computed distances or similarities is within a threshold.

At each node of the spill tree 500, the system can select or compute decisional feature representations for each child node. In some implementations, the system generates decisional feature representations by machine learning using a set of training images. In some implementations, at each non-leaf node the feature representations of the training images are clustered into a number of clusters corresponding to the number of child nodes. For two child nodes, a clustering algorithm can be used to generate two clusters of feature representations. The decisional feature representations can be calculated based on the feature representations in each cluster. In some implementations, the feature representations in each cluster are averaged together to generate each decisional feature representation. For example, feature representations of the training images can be clustered into two clusters 516 and 518. The feature representations in cluster 516 can be averaged to generate decisional feature representation $A_1$ 512, which corresponds to child node 520. In some implementations, each element of decisional feature representation 512 is calculated as a mean or other central value of corresponding elements of feature representations in cluster 516. Likewise, feature representations in cluster 518 can be averaged to generate decisional feature representation $B_1$ 514, which corresponds to child node 530. In some implementations, the clustering is performed by conventional clustering algorithms, e.g., k-means clustering.

For the next step of training the spill tree 500, images in cluster 516 will be used to generate decisional feature representations for child node 520, and images in cluster 518 be used to generate decisional feature representations for child node 530. However, for some particular feature representations in each cluster, the difference in the distance between (1) the particular feature representation and $A_1$ 512 and (2) the particular feature representation and $B_1$ 514 will be below a threshold. Region 517 illustrates a range of feature representations for which the difference in the distance to $A_1$ 512 and $B_1$ 514 was below a threshold. These decisional feature representations will cause the system traverse to both child nodes, e.g., child nodes 520 and 530 for an input feature representation within region 517.

The training process can be repeated at each non-leaf child node. For example, feature representations used to compute decisional feature representations for child node 520, i.e., those feature representations in cluster 516 as well as feature representations in region 517, are again divided into clusters 526 and 528. Feature representations in cluster 526 are used to generate decisional feature representation $A_2$ 522 corresponding to child node 540. Feature representations in cluster 528 are used to generate decisional feature representation $B_2$ 524 corresponding to child node 550. Feature representations in region 527 will be used to compute decisional feature representations of both child nodes 540 and 550 due to the difference between the distance to $A_2$ 522 and the distance to $B_2$ 524 being below a threshold.

Growth of a particular branch of the spill tree 500 can be halted by various stopping conditions. When growth of a particular branch is stopped, the remaining feature representations are contained in a resulting a leaf node. For example, leaf node 540 contains feature representations 501, 502, 503, and 504. Because data can be shared at each branch of a non-leaf node, feature representation 501 is also contained in leaf node 530. Likewise, feature representations 502 and 503 are also contained in leaf node 550. Feature representations 505, 506, and 507 appear in only a single leaf node. In some implementations, growth of a particular spill tree branch is stopped when a node contains fewer than a threshold number of feature representations. For example, further partitioning of feature representations contained in leaf node 530 can be prevented because leaf node 530 contains fewer than a threshold number of feature representations.

In some other implementations, the spill tree 500 next expands, i.e. generates additional child nodes from, leaf nodes that contain the highest number of feature representations. This approach can reduce the disparity in the number of feature representations contained in the final set of leaf nodes. Expanding leaf nodes with the largest number of feature representations can also result in an unbalanced spill tree, e.g., spill tree 500.

After the system trains the spill tree 500, each non-leaf node contains decisional feature representations for each child node. In some implementations, after calculating the decisional feature representations, other data associated with the spill tree can be discarded, such as clustering information or images in leaf nodes. Thus, only the decisional feature representations remain.

After the spill tree 500 is trained, each leaf node can be assigned a unique visual key e.g., a number. For example, leaf node 540 can be assigned the visual key 1. Leaf nodes 550 and 530 can be assigned visual keys 2 and 3 respectively.

Figure 6:
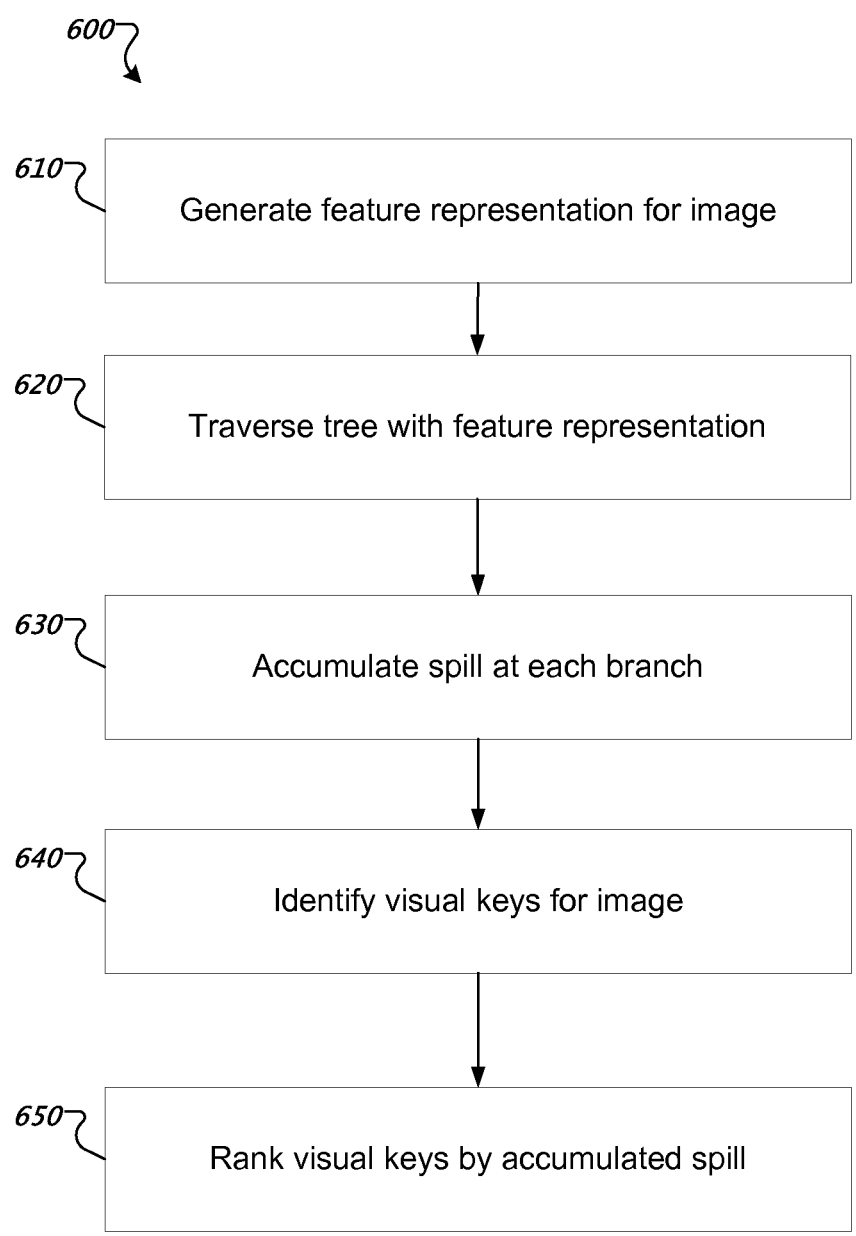
FIG. 6 is a flow chart of an example process for generating visual keys.

FIG. 6 is a flow chart of an example process 600 for generating visual keys. After assigning visual keys to the leaf nodes of the spill tree, a computer system can traverse the spill tree with feature representations for each image in a collection of images to associate one or more visual keys with each image. Images can then be associated with their respective visual keys and generated content descriptors.

The system generates a feature representation for an image (610). The feature representation can be, for example, one or more hashes, a vector of extracted feature representations, or a 32-byte content descriptor generated as described with reference to FIG. 3. In some implementations, the generated feature representation is the same type of feature representation as that used to train the spill tree as described with reference to FIG. 5.

The system traverses the spill tree with the image feature representation (620). The system traverses the spill tree to one or more leaf nodes according to the feature representation. At each non-leaf node, the system may traverse to one or multiple child nodes.

The system accumulates the spill at each branch (630), as will be described below. At any given branch in the spill tree, the image will be closer to the feature representation of one branch than to that of other branch. The system can traverse to the child node of the closest branch, but the system can also traverse to one or more other child nodes if the difference between the distances between the image and the decisional feature representations is within a threshold.

If the system also traverses to a branch farther in distance from the image, the system will be traversing the spill tree with two separate instances of the image's feature representation. For each instance of the feature representation, the system can accumulate "spill," which can be the difference between the distance from the image feature representation and each decisional feature representation.

For example, for an image feature representation X, and a choice between two branches having decisional feature representations A and B, and a distance function D, the system can compute the distances D(X, A) and D(X, B). The system will traverse to the child node corresponding to A if D(X, A) is less than D(X, B), but the system will also traverse to the child node corresponding to B with another instance of feature representation X if D(X, B)-D(X, A) is within a threshold. If the system also traverses to the child node corresponding to B, i.e., the father decisional feature representation, the system can compute the difference between D(X, B) and D(X, A) as the "spill" for the instance of X that the system uses to traverse to the child node corresponding to B.

The system identifies visual keys for the image (640). After the system traverses the spill tree with an image's feature representation to one or more leaf nodes of the spill tree, the system can associate the image with each visual key corresponding to each leaf node to which the system traversed using instances of the image's feature representation. The system can also associate the accumulated spill of a particular feature representation with visual keys associated with the image.

The system ranks the visual keys by accumulated spill (650). Among the visual keys associated with an image, there will be one visual key associated with no accumulated spill, corresponding to a leaf node that the system traversed to by always following child nodes corresponding to the closest decisional feature representation at each branch. Every other visual key can have associated with it a nonzero amount of spill. The system can rank the visual keys by the amount of associated spill, with lesser amounts of spill being considered a higher-ranking visual key. In other words, the visual key that resulted in no accumulated spill can be the highest-ranked visual key.

After generating visual keys for all images in a collection of images, the system can associate each visual key, e.g., in a posting list, with all images that generated that visual key. In other words, each image in a collection of images that generated visual key 43 can be associated with visual key 43. Each image in the collection can be associated with multiple visual keys.

Figure 7:
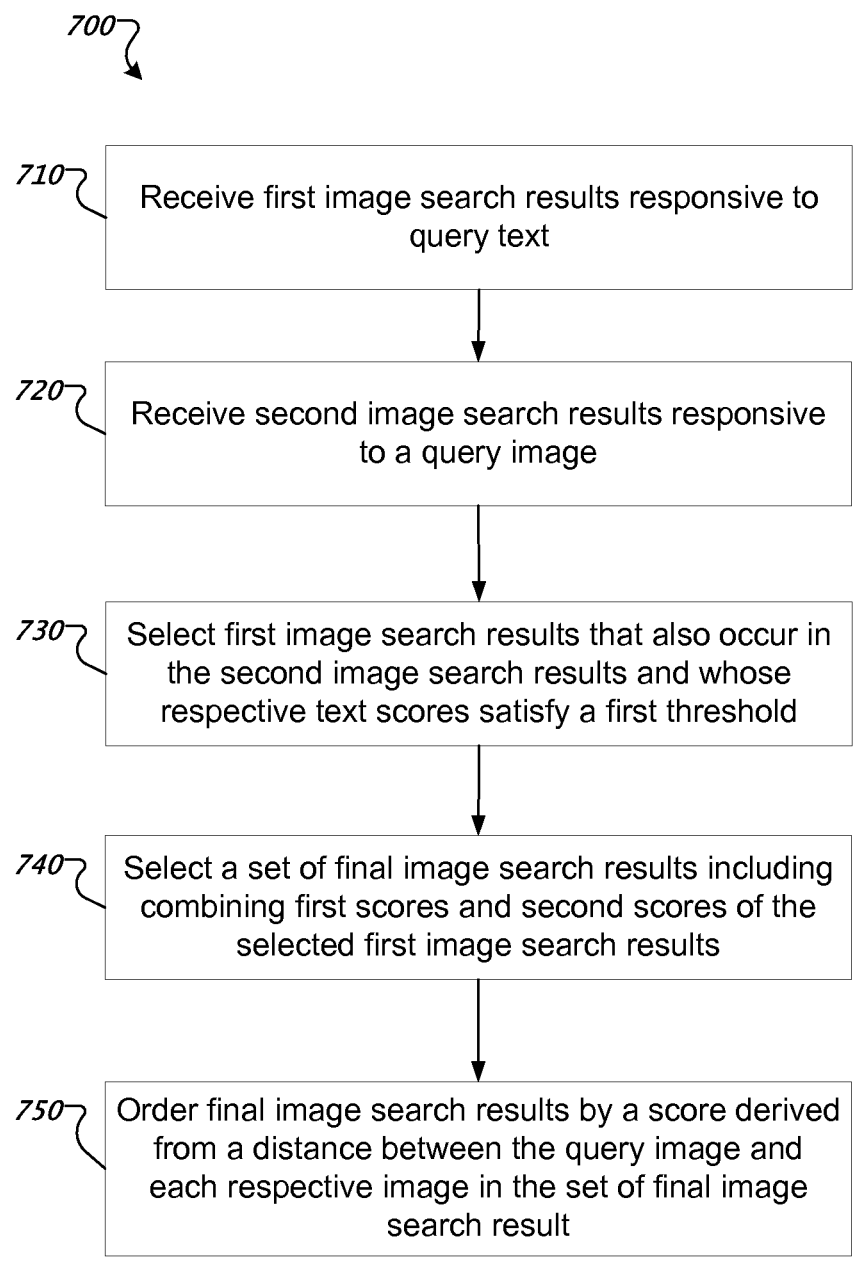
FIG. 7 is a flow chart of an example process for combining search results for query text and a query image.

FIG. 7 is a flow chart of an example process 700 for combining search results for query text and a query image. The process 700 can be implemented by a search system to return search results in response to a query containing both an image content portion, i.e. a query image, and a text portion, i.e. query text, for example, search results as shown in FIG. 1.

The system receives first image search results responsive to query text (710). In some implementations, images in a collection of images are associated with text labels. Based on the text labels, the system can generate first image search results that link to images that are responsive to query text of a query. Each identified image of the first image search results can be associated with a text score representing the relevance of the image to the query text. By way of illustration, the text score can be an Information Retrieval (IR) score determined by a search engine for an image search result that is responsive to query text of the query.

The system receives second image search results responsive to a query image (720). The system can receive images in a collection of images identified as being similar to the query image. By way of illustration, each identified image has a respective score, e.g., an IR score, determined by a search engine that indicates the similarity of the identified image to the query image. In some implementations, a feature representation is generated for the query image. This can be done, for example, by the process as shown in FIG. 3. The system can traverse a trained spill tree with the feature representation for the query image to generate one or more visual keys for the query image. The system can retrieve all images in the collection associated with each of the visual keys generated from the query image. In other words, if the query image generated visual keys 43, 521, and 748, all images associated with any one or more of visual keys 43, 521, or 748 can be identified as the second image search results. The system associates each of the second image search results with a respective score indicating a measure of similarity between the query image and each image of the second image search results. In some implementations, the system generates only those second image search results whose associated score meets a similarity threshold. The measure of similarity can be based on the distance between the content descriptor for the query image and the respective content descriptor of each image identified by the second image search results. The system can also remove second image search results that correspond to duplicate and near duplicate images to the query image, which can be identified based on the image content descriptors for the images. Other measures of similarity are possible.

The system selects one or more images of the first image search results that also occur in the second image search results and whose respective text scores satisfy a first threshold (730). The system can omit first images whose text scores do not meet the first threshold as well as images that did not appear in both of the first image search results and the second image search results. In some implementations, the system retrieves the first image search results and second image search results in parallel from a single collection of images.

The system generates a set of final image search results by combining the first scores and the second scores of the selected first image search results (740). In some implementations, the system can give a score boost to first image search results whose text score is within the scores of a threshold number of the highest-ranked first image search results. For example, the system can multiply the text scores by 150% if the first image search results are within the threshold number of highest-ranked first image search results.

The system can also adjust the text scores of certain first image search results that have a text score that is less than a dynamic percentile threshold, e.g., the bottom 30% of first image search results. In some implementations, the system computes a median of text scores and computes the percentile threshold as:

$$\text{percentile\_threshold} = 100 \times \left(1 - \frac{20 \times \text{median}}{(1 + (20 \times \text{median})^{1/3})^3}\right)$$

A demotion factor can then be calculated as:

$$\text{demotion} = \sqrt{\frac{\text{text\_score}}{\text{threshold}}},$$

where threshold is the text score at the percentile_threshold.

However, the demotion factor can be weakened if the image is particularly visually similar to the query image, which is determined by a closeness factor as:

$$\text{closeness\_factor} = \max\left(0, \frac{\text{mean\_of\_visual\_dist} - 3 \times \text{dist}}{\text{std\_deviation\_visual\_dist}}\right),$$

where mean_of_visual_dist is the mean of distances to the query image, std_deviation_visual_dist is the standard deviation of distances to the query image and dist is the distance between the image and the query image. A visual promotion score can be calculated using the closeness factor as:

$$\text{visual\_promote} = 1 + (0.6 \times \text{closeness\_factor}).$$

The final text score for the image is then calculated as:

$$\text{score} = \text{text\_score} \times \max(1, \text{demotion} \times \text{visual\_promote}).$$

The system orders the final image search results by a score derived from a distance between the query image and each respective image in the set of final image search results (750). In some implementations, the distance between the query image and each image represented in the final image search results is computed as a distance between content descriptors, e.g., the content descriptors computed by the process described in reference to FIG. 3.

In some implementations, the system reorders the final image search results a number of times, each time ordering the search results by distance to the second, third, fourth, etc., image in the final search results. In other words, on the second reordering, the remaining final image search results are ordered based on the distance between each image and the highest-ranked image, as opposed to the query image. On the third reordering, the remaining final image search results are ordered based on the distance between each image and the second-highest-ranked image, as opposed to the highest-ranked image or query image. After reordering the final image search results a number of times to identify the top N images, the ordinal position of each remaining image can be based on the distance to the top N images, rather than on the distance to the query image. For example, for N=5 top images, the ordering of each $I_k$ image in the final image search results can be determined from a score calculated as according to the following formula:

$$\text{score}(I_k) = 1 \times \text{dist}(I_1, I_k) + 0.8 \times \text{dist}(I_2, I_k) + 0.6 \times \text{dist}(I_3, I_k) + 0.4 \times \text{dist}(I_4, I_k) + 0.2 \times \text{dist}(I_5, I_k).$$

The system can additionally remove duplicate and near-duplicate images from the set of final image search results, as will be described below with reference to FIG. 8.

Figure 8:
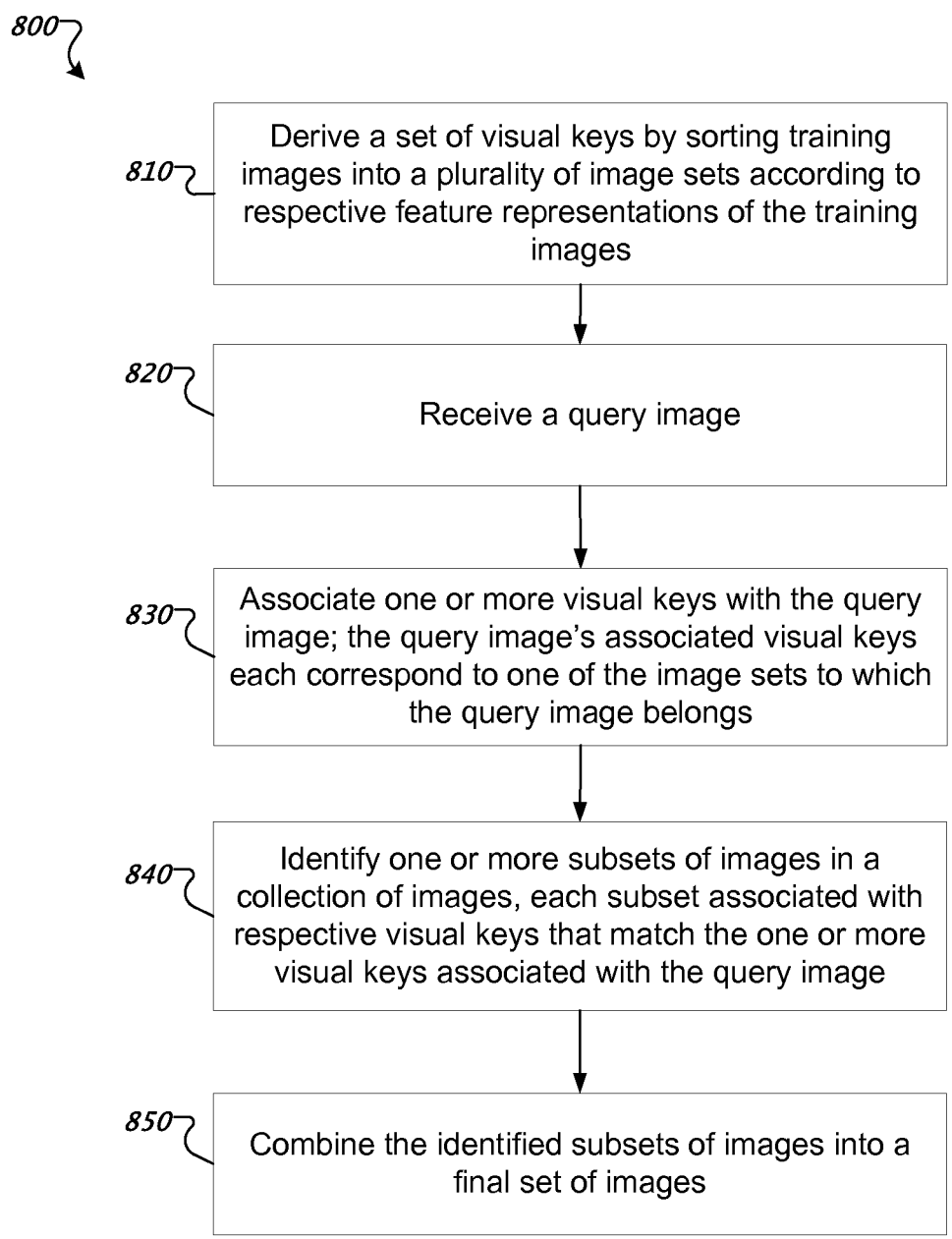
FIG. 8 is a flow chart of an example process for retrieving images by visual keys.

FIG. 8 is a flow chart of an example process 800 for retrieving images by visual keys. After training a spill tree and generating visual keys for each image in a collection of images, a computer system can use visual keys from a query image to identify similar images by visual keys.

The system derives a set of visual keys by sorting training images into a plurality of image sets according to respective feature representations of the training images (810). In some implementations, the system trains a spill tree using a set of training images, where the first image sets correspond to the leaf nodes of the spill tree. In some other implementations, the system uses hash functions to assign each image to one or more image sets.

The system receives a query image (820). The query image can be an image for which images with content similar to the query image are to be identified.

The system associates one or more visual keys with the query image. The query image's associated visual keys each correspond to one of the image sets to which the query image belongs (830). In some implementations, the system generates a feature representation for the query image and uses the feature representation to traverse a spill tree to generate visual keys for the query image.

The system distinguishes one or more subsets of images in a collection of images. Each subset is associated with respective visual keys that match the one or more visual keys associated with the query image (840). In some implementations, the system uses a feature representation for each image in the collection to traverse a spill tree. Leaf nodes traversed to by the feature representation are associated with each image as visual keys for the image.

The system combines the subsets of images into a final set of images (850). The system can combine the image subsets by a union in which all images from the subsets are included in the final set. The system can also combine the image sets by an intersection in which only images that appear in all the subsets are included in the final set of images.

The system can additionally combine any arbitrary number of image sets by any number of unions and intersections. The system can also perform any number of unions or intersections with sets of images that satisfy a text query. In some implementations, for searching for similar images only, the system can produce the intersection of five second image sets. In other words, the system retrieves images that share at least five visual keys with the query image. In some other implementations, when processing a text and image query, the system can return an intersection of the text query with a union of three second image sets. In other words, the system can retrieve images that are relevant to the text query and which share any of three visual keys with the query image.

The system can also use machine learning to learn which combinations of visual keys are associated with certain text labels. For example, the system could learn which combination of visual keys is associated with a certain breed of dog, e.g., beagle. The system can then accept a search specifying "dog" (the text query) and visual keys associated with beagles.

Additionally, the system can combine image sets by specifying visual keys that should not be included in the final set of images. For example, the system can omit images with visual keys that have been identified as undesirable. The system can allow users to specify both image content that is desirable and image content that is undesirable.

Figure 9:
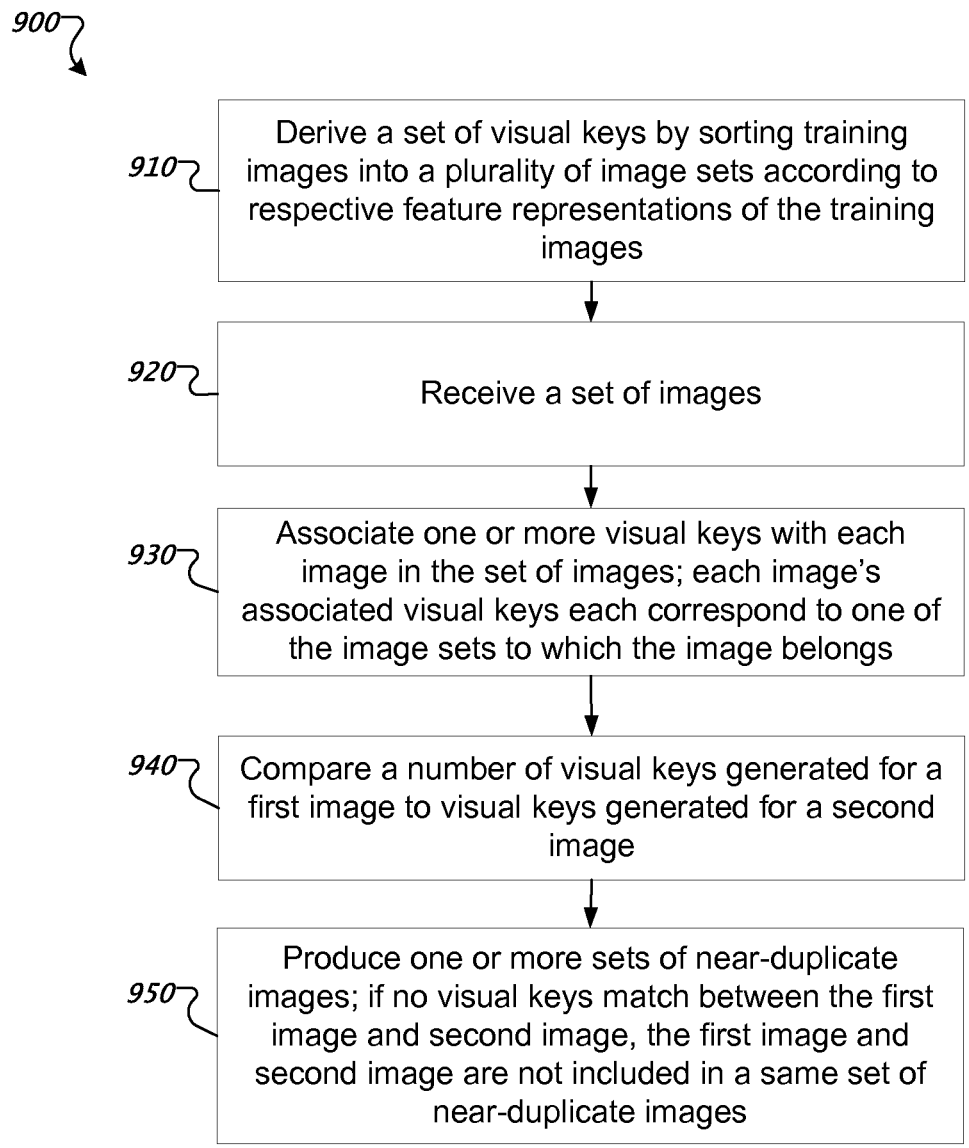
FIG. 9 is a flow chart of an example process for identifying near-duplicate images.

FIG. 9 is a flow chart of an example process 900 for identifying near-duplicate images. When retrieving images based on similarity, it can be desirable to remove images that are virtually identical. Near-duplicate images can be identified by computing distances between images using, for example, content descriptors associated with each image. However, it can be computationally expensive to compute each distance between each image in a set of images. Generated visual keys can be used to determine that two images are not near-duplicates without explicitly computing the distance between the images. In some implementations, however, identifying images as near-duplicates requires explicitly computing a distance between the images.

The system derives a set of visual keys by sorting training images into a plurality of image sets according to respective feature representations of the training images (910). In some implementations, the system trains a spill tree using a set of training images, where the image sets correspond to the leaf nodes of the spill tree. In some other implementations, the system uses hash functions to assign each image to one or more first image sets. The system can then defines a distinct visual key corresponding to each image set.

The system receives a set of images (920). The set of images can be received, for example, from a process that combines images that match a text query and images that match an image query, such as the process described with reference to FIG. 6.

The system associates one or more visual keys with each image in the set of images. Each image's associated visual keys each correspond to one of the image sets to which the image belongs (930). In some implementations, the system uses a feature representation for each image to traverse a spill tree. Leaf nodes traversed to by the feature representation are associated with each image as visual keys for the image.

The system compares a number of visual keys generated for a first image to a number of visual keys generated for a second image (940). For example, the system can compare the two highest-ranked visual keys for each image. Visual keys for an image can be ranked according to the amount of spill that resulted when reaching that visual key for the image by traversing the spill tree.

In some implementations, the highest-ranked visual keys are stored in a bit vector for each image, and a bitwise AND operation is performed between bit vectors of images to determine whether any visual keys match between the respective images. For example, a 256-bit vector can contain all zeroes except for at vector positions of visual keys for the associated image, which instead contain ones. If more visual keys exist than the size of the bit vector, the visual key numbers can be assigned with a modulo operator. After assigning visual keys to a bit vector associated with each image, if a bitwise AND between respective bit vectors yields any nonzero bits, the images cannot be ruled out as near-duplicates and the full distance between the images can be calculated to determine if the images are near-duplicates.

The system produces one or more sets of near-duplicate images; if no visual keys match between the first image and the second image, the first image and the second image are not included in a same set of near-duplicate images (950). If none of the highest-ranked visual keys match between two images, the system deems it likely that the images are not near-duplicates. When no highest-ranked visual keys match between images, the system does not calculate the distance between the images to determine whether the images are near-duplicates, resulting in saved computational expense. The system can take additional measures to improve performance of identifying near-duplicate images.

Figure 10:
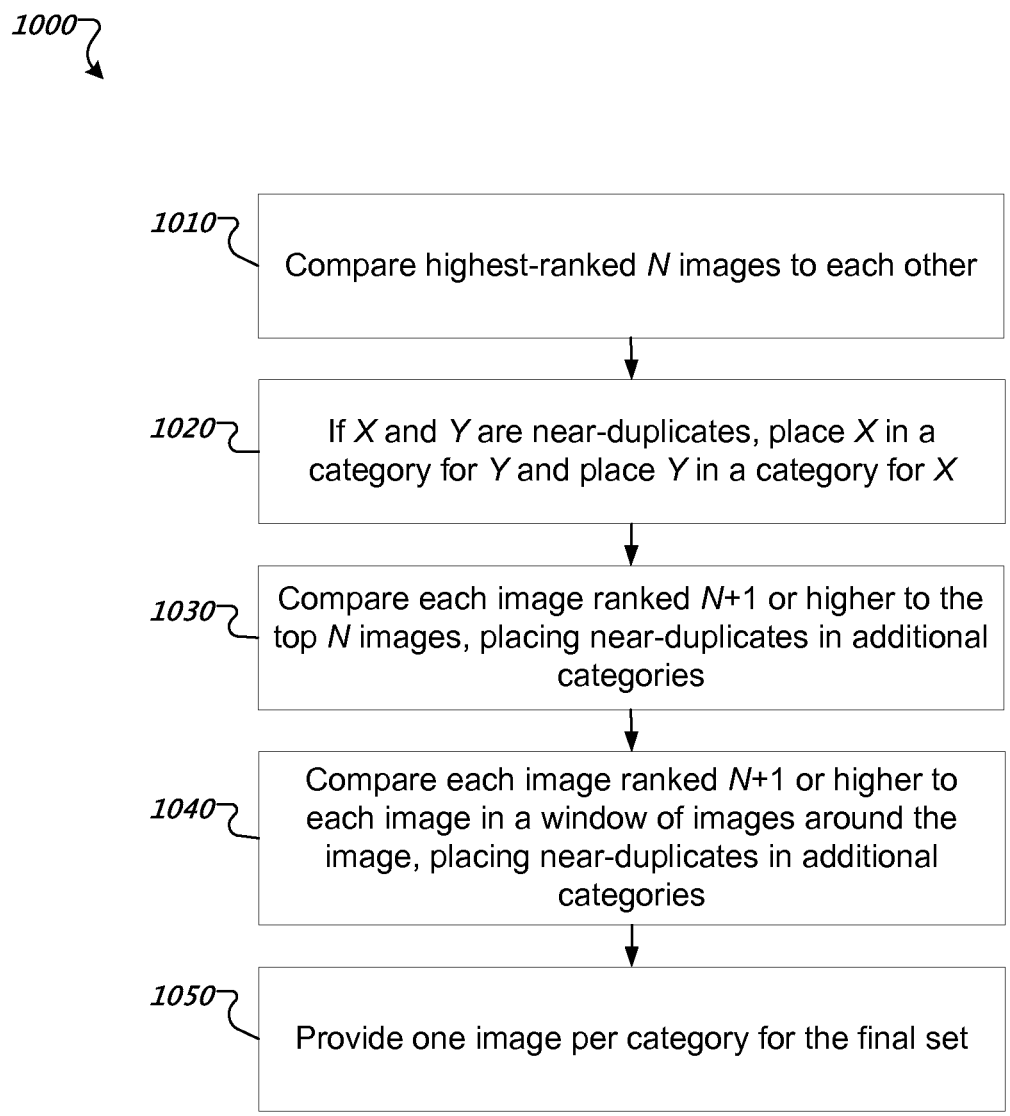
FIG. 10 is a flow chart of another example process for identifying near-duplicate images.

FIG. 10 is a flow chart of an example process 1000 for identifying near-duplicate images. The example process 1000 can be combined with the process 900 described in reference to FIG. 9 for efficiently identifying near-duplicate images. The process 1000 will be described as being performed on a ranked set of received images, among which near-duplicate images will be identified.

The system compares the highest-ranked N images to each other (1010). In some implementations, N=100, in which case each of the highest-ranked 100 images is compared to each of the other highest-ranked 99 images. In some implementations, the images are compared by computing distances between their respective content descriptors, or some other feature representation. If the computed distance between two images is below a threshold, the system determines that the two images are near-duplicates. The system can also determine that two images are not near-duplicates if they have no visual keys in common.

If an image X and an image Y of the highest-ranked N images are near-duplicates, the system places image X in a category for image Y, and the system places image Y in a category for image X (1020). Grouping near-duplicate images into categories allows transitivity between near-duplicate images. That is, if X and Y are near-duplicates and Y and Z are near-duplicates, then the system can consider X and Z also to be near-duplicates by virtue of appearing in a same category.

The system compares each image ranked between N+1 and an upper bound M in the ranked set to the N highest-ranked images, placing near-duplicates in additional categories (1030). If N is 100 and M is 1000, the system can, for example, compare each image ranked 101-1000 to each of the top 100 ranked images. If any near-duplicates A and B are identified, the near-duplicates are added to additional categories. In other words, A is added to a category for B, and B is added to a category for A.

The system compares each image ranked between N+1 and M to each image in a window of images around the image, placing near-duplicates in additional categories (1040). In some implementations, the window is 3-5 images higher or lower than each image in the ranked set of images. For example, the system can compare an image A ranked at position 203 to images ranked 200, 201, 202, i.e. the three adjacent images ranked higher than the image, as well as images ranked 204, 205, and 206, i.e. the three adjacent images ranked lower than the image.

The system provides one image per category for the final ranked set of images (1050). The system can select a single image for each category for the final ranked set of images. In some implementations, the system selects the highest-ranked image in each category.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, the method comprising:
   receiving a query image;
   generating a feature representation of the query image;
   traversing a spill tree with the feature representation of the query image, wherein the spill tree comprises non-leaf nodes that each have a pair of decisional feature representations, and wherein traversing the spill tree comprises traversing the spill tree to two or more leaf nodes based on computed distances between the feature representation of the query image and decisional feature representations of one or more traversed non-leaf nodes of the spill tree;
   for each branch of the spill tree traversed with the feature representation of the query image, calculating accumulated spill based on, for each traversed non-leaf node of the branch, a distance from the feature representation of the query image and each decisional feature representation of the traversed non-leaf node;
   identifying two or more visual keys for the query image, each identified visual key corresponding to one of the two or more leaf nodes traversed to by the feature representation of the query image;
   ranking the two or more visual keys of the query image based on, for each visual key, the accumulated spill for the branch of the spill tree that includes the leaf node to which the visual key corresponds;
   identifying one or more subsets of images in a collection of images, each subset associated with a respective visual key that matches one of the highest-ranked visual keys for the query image; and
   generating a set of image search results for the query image corresponding to images in the identified one or more subsets of images.

2. The method of claim 1, further comprising determining which of one or more branches of the spill tree to traverse based on a distance between a distance between the feature representation of the query image and each decisional feature representation.

3. The method of claim 1, further comprising:
   ordering the set of image search results by a second distance between each image identified in the set of image search results and the query image, wherein the second distance is based on respective feature representations for each image in the set of image search results and a feature representation for the query image.

4. The method of claim 1, wherein generating the set of image search results comprises generating a union or an intersection of the identified subsets of images.

5. The method of claim 1, further comprising generating the visual keys by traversing the spill tree with a feature representation for each image.

6. The method of claim 5, further comprising: training the spill tree with a plurality of training images, wherein training comprises generating a pair of decisional feature representations at each non-leaf node of the spill tree.

7. The method of claim 6, further comprising generating the decisional feature representations by averaging feature representations of training images at each non-leaf node of the spill tree.

8. A system, comprising:
   one or more computers and one or more storage devices storing instructions that are operable, when executed by the one or more computers, to cause the one or more computers to perform operations comprising:
   receiving a query image;
   generating a feature representation of the query image;
   traversing a spill tree with the feature representation of the query image, wherein the spill tree comprises non-leaf nodes that each have a pair of decisional feature representations, and wherein traversing the spill tree comprises traversing the spill tree to two or more leaf nodes based on computed distances between the feature representation of the query image and decisional feature representations of one or more traversed non-leaf nodes of the spill tree;

for each branch of the spill tree traversed with the feature representation of the query image, calculating accumulated spill based on, for each traversed non-leaf node of the branch, a distance from the feature representation of the query image and each decisional feature representation of the traversed non-leaf node;

identifying two or more visual keys for the query image, each identified visual key corresponding to one of the two or more leaf nodes traversed to by the feature representation of the query image;

ranking the two or more visual keys of the query image based on, for each visual key, the accumulated spill for the branch of the spill tree that includes the leaf node to which the visual key corresponds;

identifying one or more subsets of images in a collection of images, each subset associated with a respective visual key that matches one of the highest-ranked visual keys for the query image; and generating a set of image search results for the query image corresponding to images in the identified one or more subsets of images.

9. The system of claim 8, the operations further comprising determining which of one or more branches of the spill tree to traverse based on a distance between a distance between the feature representation of the query image and each decisional feature representation.

10. The system of claim 8, wherein the operations further comprise:

ordering the set of image search results by a second distance between each image identified in the set of image search results and the query image, wherein the second distance is based on respective feature representations for each image in the set of image search results and a feature representation for the query image.

11. The system of claim 8, wherein generating the set of image search results comprises generating a union or an intersection of the identified subsets of images.

12. The system of claim 8, wherein the operations further comprise generating the visual keys by traversing the spill tree with a feature representation for each image.

13. The system of claim 12, wherein the operations further comprise: training the spill tree with a plurality of training images, wherein training comprises generating a pair of decisional feature representations at each non-leaf node of the spill tree.

14. The system of claim 13, wherein the operations further comprise generating the decisional feature representations by averaging feature representations of training images at each non-leaf node of the spill tree.

15. A non-transitory computer storage medium storing instructions executable by a data processing apparatus and that upon such execution cause the data processing apparatus to perform operations comprising:

one or more computers and one or more storage devices storing instructions that are operable, when executed by the one or more computers, to cause the one or more computers to perform operations comprising:

receiving a query image;

generating a feature representation of the query image;

traversing a spill tree with the feature representation of the query image, wherein the spill tree comprises non-leaf nodes that each have a pair of decisional feature representations, and wherein traversing the spill tree comprises traversing the spill tree to two or more leaf nodes based on computed distances between the feature representation of the query image and decisional feature representations of one or more traversed non-leaf nodes of the spill tree;

for each branch of the spill tree traversed with the feature representation of the query image, calculating accumulated spill based on, for each traversed non-leaf node of the branch, a distance from the feature representation of the query image and each decisional feature representation of the traversed non-leaf node;

identifying two or more visual keys for the query image, each identified visual key corresponding to one of the two or more leaf nodes traversed to by the feature representation of the query image;

ranking the two or more visual keys of the query image based on, for each visual key, the accumulated spill for the branch of the spill tree that includes the leaf node to which the visual key corresponds;

identifying one or more subsets of images in a collection of images, each subset associated with a respective visual key that matches one of the highest-ranked visual keys for the query image; and generating a set of image search results for the query image corresponding to images in the identified one or more subsets of images.

* * * * *